US008024063B2

(12) United States Patent
Redford et al.

(10) Patent No.: US 8,024,063 B2

(45) Date of Patent: Sep. 20, 2011

(54) PROCESS AND SYSTEM FOR TRACKING OF MAIL

(75) Inventors: Dale E. Redford, Grand Prairie, TX (US); Floyd W. Worth, II, Richardson, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 1068 days.

(21) Appl. No.: 11/840,749

(22) Filed: Aug. 17, 2007

(65) Prior Publication Data

US 2009/0048704 A1 Feb. 19, 2009

(51) Int. Cl.
*G06F 7/00* (2006.01)
*G06K 9/00* (2006.01)

(52) U.S. Cl. ........................................ 700/224; 209/584

(58) Field of Classification Search .................. 700/223, 700/224; 209/584, 583

See application file for complete search history.

(56) References Cited

U.S. PATENT DOCUMENTS

| | | | | |
|---|---|---|---|---|
| 5,422,821 | A | 6/1995 | Allen et al. | 364/478 |
| 6,239,397 | B1 | 5/2001 | Rosenbaum et al. | 209/584 |
| 6,801,833 | B2 | 10/2004 | Pintsov et al. | 700/223 |
| 6,822,182 | B2 | 11/2004 | Kechel | 209/584 |
| 7,112,031 | B2 | 9/2006 | Harres et al. | 414/593 |
| 7,195,236 | B2 | 3/2007 | Hillerich, Jr. et al. | 271/2 |
| 2005/0077353 | A1 | 4/2005 | Oishi et al. | 235/385 |
| 2008/0111675 | A1 * | 5/2008 | Tuttle | 340/505 |
| 2008/0164185 | A1 * | 7/2008 | Stemmle | 209/584 |
| 2008/0230449 | A1 * | 9/2008 | Stemmle | 209/584 |

FOREIGN PATENT DOCUMENTS

| | | | |
|---|---|---|---|
| DE | 10037756 | C1 | 11/2001 |
| EP | 1515279 | A1 | 3/2005 |
| WO | 2004030836 | A1 | 4/2004 |
| WO | 2006012399 | A2 | 2/2006 |

* cited by examiner

*Primary Examiner* — Ramya Prakasam

(74) *Attorney, Agent, or Firm* — Filip A. Kowalewski

(57) ABSTRACT

A process of tracking mail during postal handling includes an initial step of sorting an incoming stream of mail on an automated sorting machine to a series of pockets based on a sort scheme. During sorting, RFID-tagged, machine-sortable markers are introduced into the incoming mail stream at intervals and the RFID-tagged markers are sorted with the mail into pockets of the sorter. Mail and markers are swept from the pockets into trays, and the markers are introduced such that at least one marker is swept to each of a set of trays containing the sorted mail. The trays containing the mail and markers are then transported away from the automated sorting machine. During a postal operation subsequent to the initial sorting, one or more of the RFID-tagged markers are scanned to identify mail from the initial sorting.

12 Claims, 12 Drawing Sheets

PROCESS AND SYSTEM FOR TRACKING OF MAIL

BACKGROUND OF THE INVENTION

The U.S. Postal Service (USPS) receives and delivers an enormous volume of mail each day through a system that includes regional processing and distribution centers (P&DC's) and local post offices within each region served by a P&DC. See, for example, the diagram presented as FIG. 1 in Allen et al. U.S. Pat. No. 5,422,821. Mail received from postal patrons in each region is sorted at a high level, such as by the first three digits of the zip code at each P&DC, according to a sort scheme that also separates mail that should be sent to one of the local post offices within that region from mail that should be shipped to another P&DC for high level sorting ("outgoing mail".) Each P&DC thus sends and receives mail from other P&DC's, and also receives for sorting collection mail from within its associated region. Commercial mailers create bulk mailings that qualify for discounted postal rates which bypass some of the channels that collection mail is sent through and is presorted to a greater or lesser degree.

The USPS is committed to achieving delivery times that meet its published goals and seeks to avoid loss of mail in transit. If an error occurs in a sorting process that occurs at a P&DC, such goals can be seriously compromised. The sorting machines used at P&DC's scan mail moving rapidly on a pinch belt conveyor and sort it to one of a large number of bins or pockets. As these pockets become full during the sorting process, a postal worker sweeps the mail from each pocket into a postal tray. Each tray can hold 200-400 mail pieces. Thus, at the end of a sorting run, there are often two or more sets of trays containing mail that will be processed together at the next step, whether that step is a second sort or shipment to another P&DC. These trays are often grouped together on a cart, but trays containing mail from a single pocket in the previous sort may be split among several carts when necessary.

Errors are very costly to the USPS and can occur if some of the mail that should have been transported on to a secondary process is overlooked. If a single tray of mail is misplaced and found later in the P&DC, the mail in the tray will have missed the second step (such as a secondary sort) and have to be processed separately. This will also delay delivery of the misplaced mail to its recipient to a time much later than the stated postal performance goal. At present, however, the USPS must rely on human workers to make certain that mail is transported rapidly and accurately within each P&DC. Occasional errors cannot be avoided, and no automated system has been proposed to eliminate these errors in a manner that is practical considering the circumstances under which postal sorting facilities operate.

Placement of RFID tags on mail pieces in order to identify them has been proposed. See, for example, Sadatoshi et al. U.S. Patent Pub. 20050077353, which allows multiple mail pieces in a tray to be read by RFID. Most RFID readers presently available specify 4 inches between tags because the tag in front relative to the reader shades the one behind it. The system of Sadatoshi et al solves that problem, but it only works if the tray is moved parallel and in close proximity to the reader antenna with mail perpendicular to the plane of movement. This would not be practical for a cart of mail in trays, but could be made to work in a tray management system where the trays are moved down conveyors.

The USPS is implementing a system for tracking mail which they have called an "intelligent mail bar code", which is a 4-state 65-bar code that can encode 31 digits of information. This will allow mailers to apply a unique tracking identification number to each mailpiece. When the mail arrives at the facility, electronic manifests coupled with a unique tray and/or pallet identifier, such as an RFID tag as described in Pintsov U.S. Pat. No. 6,801,833, can enable a hierarchical tracking of the mail as the trays are removed from the pallet and sent to a sorting system such as a Delivery Bar Code Sorter (DBCS). Pintsov also describes placing an RFID tag on each mail piece, but this has several drawbacks including the cost of the tags and the difficulty doing an RFID tag read on a cart carrying thousands of mail pieces. Even reads of a tray of mail where each piece has an RFID tag are not reliable because the transmission of one tag can "shade" the transmission of adjacent tags. RFID tags cannot be scanned as fast as bar codes and thus it is not practical to scan them as the mail is being transported on a sorting machine conveyor at high speed.

Given that it is not practical to put an RFID tag on each mail piece, identification of the mail in a tray is not possible after the mail has been removed from the original tray and mixed with other mail in a sorting operation. Each time a mail piece is sorted on a sorting machine, the barcode is read and tracking data is available, but it is not practical to keep track of the mail as it is removed from a pocket on the sorter and placed in a mail tray in today's operation. This is because the operator sweeping the system must leave a small amount of mail in the pocket for safety reasons, so it is not known how much of the mail was removed. The operator also typically prints up tray labels in batches and keeps them near the appropriate trays. These labels contain routing information only and cannot be used to uniquely identify trays. To make a unique identifier, the operator would either have to print a unique tag for each tray as the tray is filled, or a means would have to be provided to identify the tray as it is filled. Neither of these methods is practical because the operator is too busy to wait for a tag to be printed and the sorting machines are quite large, so a distributed tray reading system would be very expensive.

The USPS has been tracking mail manually within its facilities for decades, and no workable solution to the problem of tracking mail within a postal sorting center has been found. A practical solution to the foregoing problems with tracking mail within the postal system, i.e. within a single postal sorting plant and as mail is shipped from one facility to another, must require little or no element of human intervention or judgment. Ideally such a process would be fully automated, or nearly so. The present invention provides a solution to this difficult and long-felt problem.

SUMMARY OF THE INVENTION

A process of tracking mail during postal handling according to the invention includes an initial step of sorting an incoming stream of mail on an automated sorting machine to a series of pockets based on a sort scheme. During sorting, RFID-tagged, machine-sortable markers are introduced into the incoming mail stream at intervals and the RFID-tagged markers are sorted with the mail into pockets of the sorter. Mail and markers are swept from the pockets into trays, and the markers are introduced such that at least one marker is swept to each of a set of trays containing the sorted mail. The trays containing the mail and markers are then transported away from the automated sorting machine. During a postal operation subsequent to the initial sorting, one or more of the RFID-tagged markers are scanned to identify mail from the initial sorting.

The sort scheme will be of the type typically used in postal processing based on destination codes such as zip codes, depending on what level the sort is occurring on. During or prior to sorting, RFID-tagged, machine-sortable markers are introduced into the incoming mail stream at a frequency such that at least one marker is placed in each tray or other container of mail swept from each sorter pocket. This is based on assumptions that the human sweeper or an automated equivalent, such as described in Harres et al. U.S. Pat. No. 7,112,031, Sep. 26, 2006, the contents of which are incorporated by reference herein, will substantially fill each tray if there are a sufficient number of mail pieces in the pocket to do so, and will empty each pocket at the end of the sort. There is no need to know or keep track of the exact number of mail pieces the sweeper decides to put in the tray. The markers are sorted with the mail into pockets of the sorter, and the sorting system keeps a record of the number of markers used. The markers are preferably bar coded so that they can be scanned during sorting in the same manner as the mail pieces, but in the most basic embodiment of the invention the sorter is at least programmed to recognize and distinguish markers from actual mail intended for delivery to postal customers.

As sorting proceeds and thereafter, the sorted mail and RFID-tagged markers are swept from the pockets into trays or other postal containers, at least one marker per container. In this manner all of the mail from the sorting run can be tracked by scanning the RFID tags and thereby verifying that all of the mail that was removed from the sorting machine is present for purposes of a further processing step, such as a second stage sort or transport to another facility.

Mail trays as discussed above are typically stored on carriers such as carts for transport about the mail facility, usually several trays per cart. According to a preferred form of the invention, an RFID tag and correlated visible marking is placed on each cart to cover the circumstance where mail is put on the wrong cart. A computer maintains a record of cart ID's and RFID tags that are associated with that cart. If a tray is placed on the wrong cart), a human mail handler is informed which cart has the wrong mail on it.

A marker according to the invention is shaped like a mail piece, i.e., rectangular, but preferably taller than most commonly sent mail pieces, and visually noticeable (such as by means of a colored stripe along the top), and have the tag number printed near the top so a person can readily identify it when it is stacked with mail in the tray. A preferred marker of the invention is configured for use in a postal sorting facility and comprises a flexible rectangular body of dimensions suitable for sorting in an automated postal sorting machine used to sort letter mail, an RFID-tag on the body identifying the marker when scanned, a optically scannable code on the marker body which identifies the marker to the sorting machine, which code is correlated to a value of the RFID tag, and human-readable identification indicia printed on the marker body, including the tag number mentioned above. These and other aspects of the invention are discussed in the detailed description that follows.

BRIEF DESCRIPTION OF THE DRAWING

In the accompanying drawings, wherein like numerals indicate like elements.

DETAILED DESCRIPTION

Figure 1:
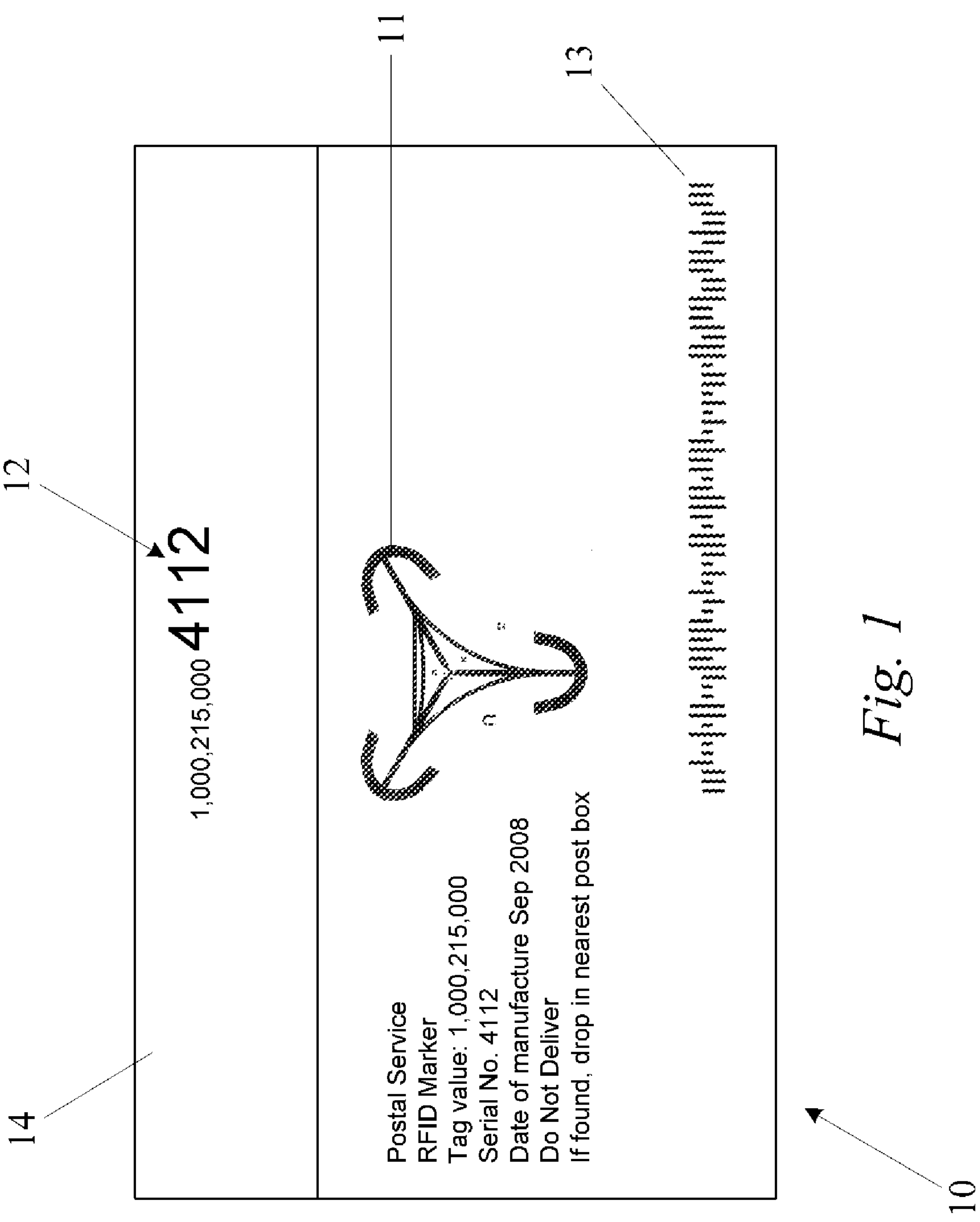
FIG. 1 is a front view of an RFID-tagged marker according to the invention.

Referring to FIG. 1, the present invention involves adding RFID-tagged markers (RTM's) 10 to a stream of mail being processed on a sorter. These special markers 10 resemble mail pieces, but use of actual mail pieces as markers is not preferred. Use of mail pieces as the markers is possible by applying RFID tags to selected mail pieces, but prevents re-use of the tags and requires an additional process for labeling mail with the tags. Marker 10 has an RFID tag 11 with a unique value pre-programmed, unique human-readable ID number (including a tag number and serial number) 12 and a printed unique bar code 13. Marker 10 is preferably at the maximum permitted height of a letter mail piece, 6⅛ inches, with a human readable serial number printed at the top, and may be color differentiated such as by a horizontal stripe 14 across the top wherein the number 12 is printed. In general, a marker 10 in a tray should be easily identified visually because not many mail pieces of the type sorted on postal letter sorting machines are over 5 inches tall. Marker 10 also has a scannable ID code that is correlated to the RFID tag number such as an intelligent mail barcode 16 as described above. This allows the computer controlling operation of the sorting machine to identify the RFID number 12 of marker 10 as it passes. "Correlated" in this case means the code numbers, alphanumerics or the like are the same, or that one can be used to reference the other in a table or database used by the control computer. A "unique" code for purposes of the invention is one that is different from the codes for all other items of the same type within the system in which the item (such as a marker 10) is used.

Figure 2:
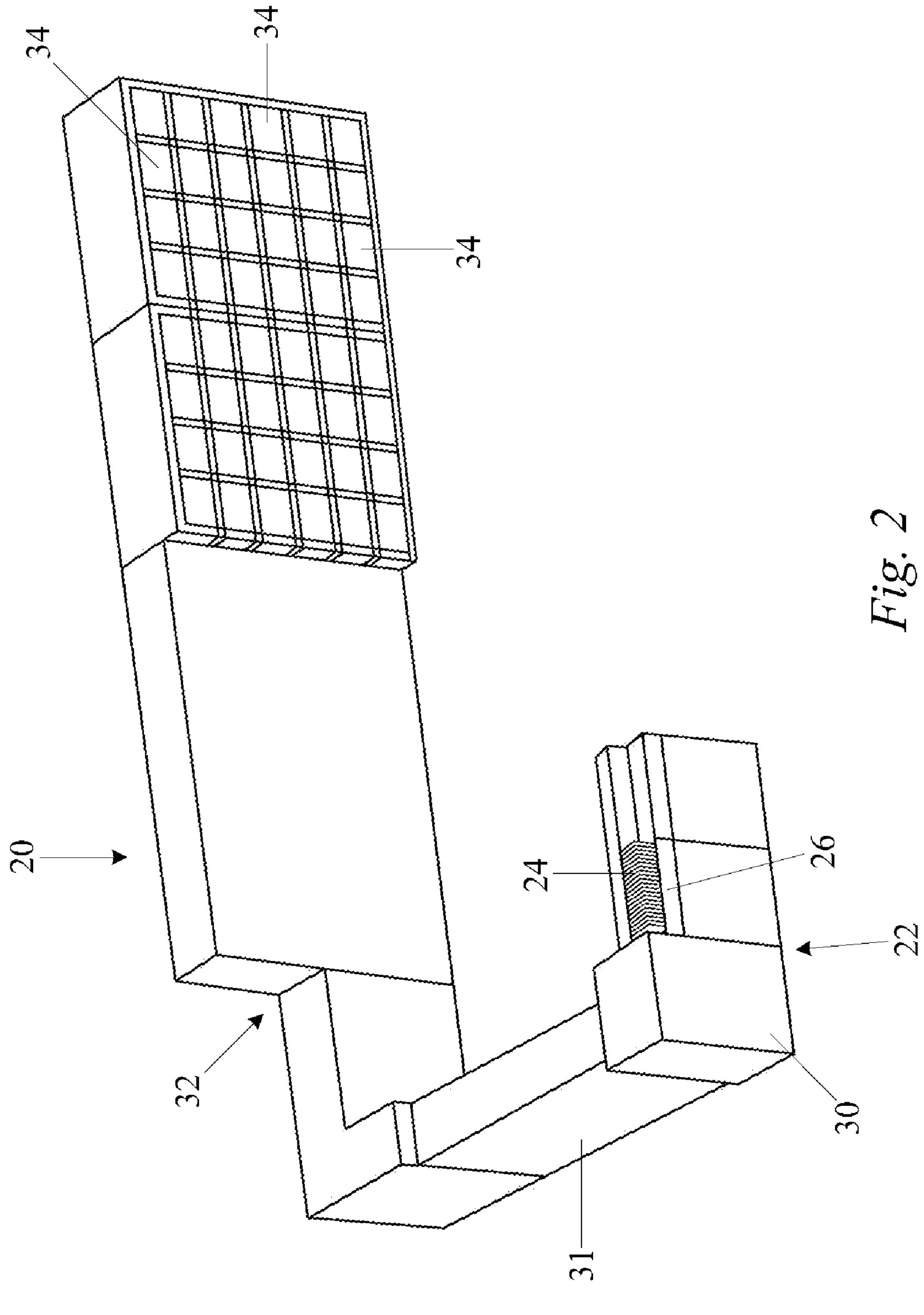
FIG. 2 is a perspective view of an automated mail sorting machine.

The initial sort in which markers 10 are combined into a mail stream can be carried out on a sorter 20 such as a DBCS machine shown in FIG. 2. Sorter 20 includes a mail feeder 22 upon which a stack 24 of mail pieces 25 are loaded onto a ledge 26 for processing. Mail feeder 22 advances the stack 24 to a pick off mechanism 30. Pickoff 30 feeds a singulated stream of mail pieces through a pinch belt conveyor system of transport section 31 to an automated sorting section 32 which sorts the mail to a plurality of pockets or bins 34. In transport section 31 or at the start of sorting section 32, each mail piece is optically scanned for address information, and markers 10 are likewise scanned to identify them as markers and determine the ID number of the marker. For purposes of the present invention, “optically scannable” refers to indicia that can be scanned using light, i.e., visible light, infrared or UV.

Figure 3:
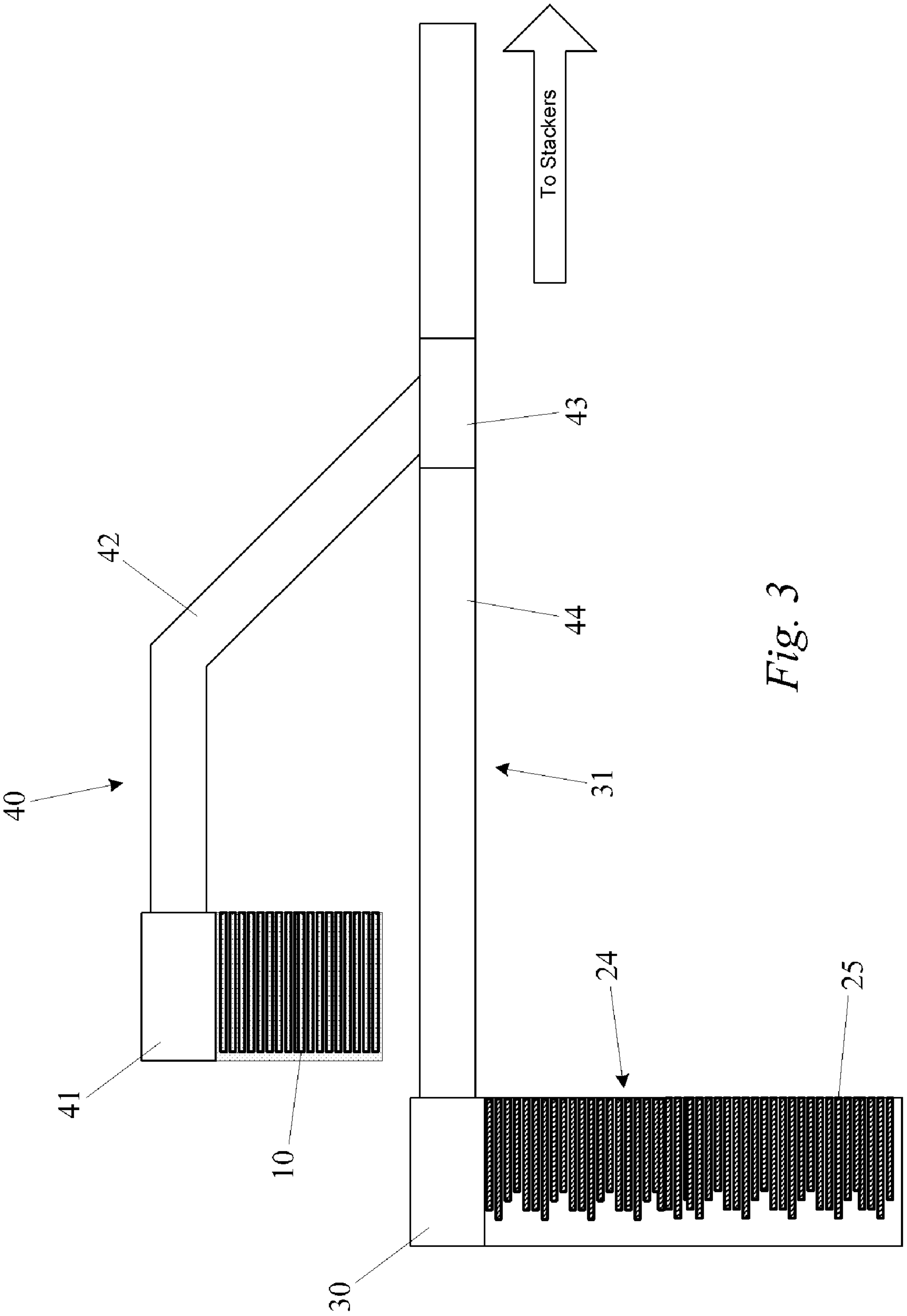
FIG. 3 is a schematic diagram of an automatic marker feeding system for use with the machine of FIG. 2.

Referring to FIG. 3, markers 10 can be introduced into the mail stream automatically by means of an automatic marker feeding system 40 that includes a feeder pickoff 41 that feeds a stack of markers 10 one at a time to a branch pinch belt conveyor 42. Conveyor 42 brings each label to a merge 43 of a type conventionally used in mail transport systems so that each marker 10 is inserted into the stream of mail pieces 25 moving along a main pinch belt conveyor 44 of transport section 31. Insertion of markers 10 at merge 43 is carried out by the computer that controls sorting machine 20. Merge 43 is located upstream from the scanner that reads destination address information for each mail piece 25 and reads the bar code 13 from each marker 10.

The control computer maintains a database (in memory, or saved to a data storage medium) associating the marker ID codes with mail from the initial sort. Later processes will reference a scanned ID code of a marker with associated mail in the database. Sort databases of this type can be archived, but once the mail has been sorted again or delivered, the associations of the markers are redefined and the database can be erased or archived.

Figure 4A:
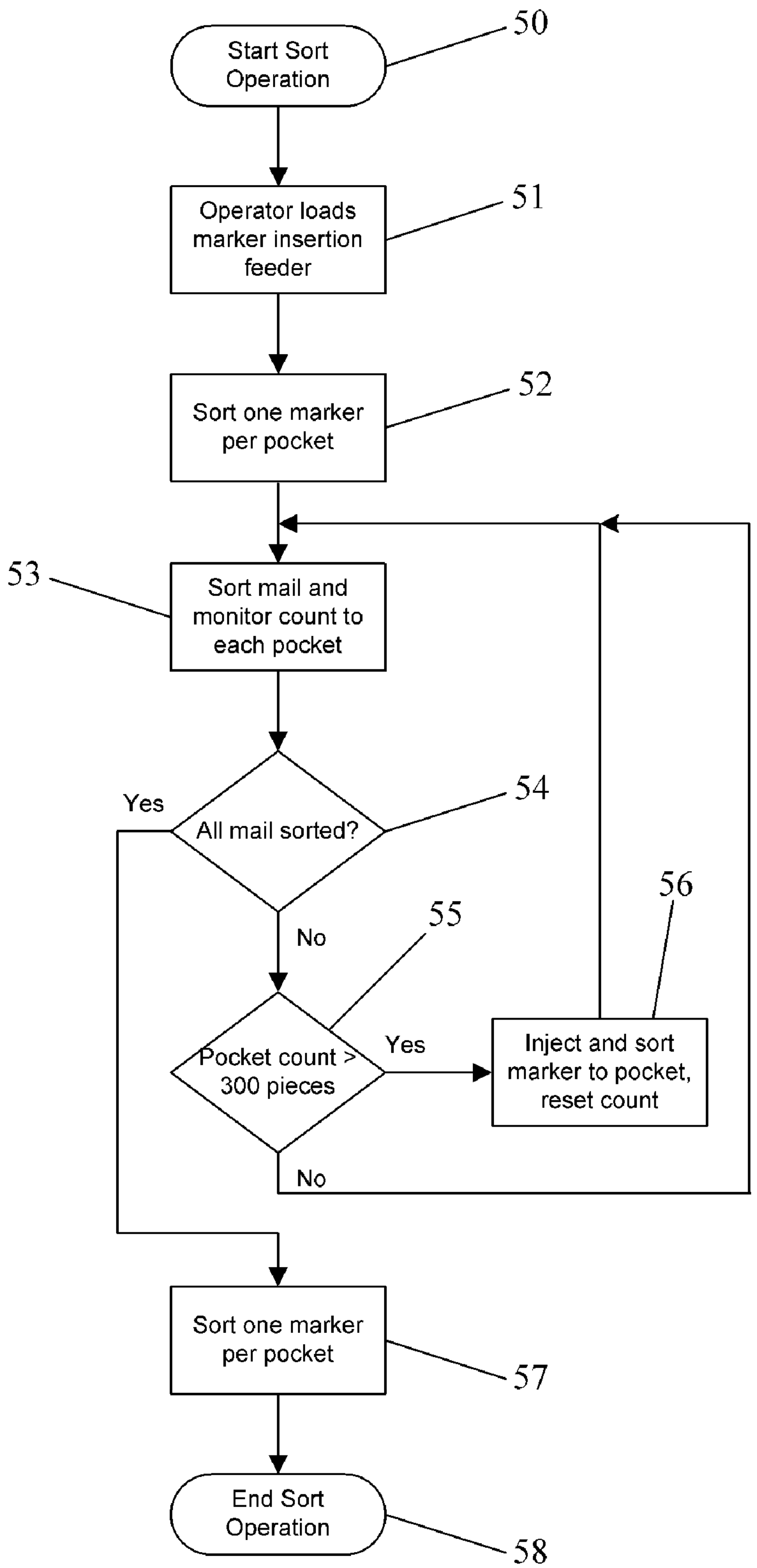
FIGS. 4A and 4B are flow diagrams of sorting processes using markers according to the invention.

The sorting process commences as shown in FIG. 4A. The operator first loads the marker feeding system 40 with markers (step 51) and commences the sorting operation by operating feeder system 40 according to a computerized sort scheme that feeds one marker 10 to each pocket (step 52). If advanced mail tracking is to be carried out as described further below, it will associate the ID number of each marker 10 with the destination code for its respective pocket 34. In the next step 53, it commences sorting mail to pockets 34 according to the sort plan and keeps a count of the number of mail pieces sorted to each pocket 34. Each time a mail piece is sorted, the control computer determines if all mail has been sorted (decision 54). If not, the computer determines in a decision 55, for the pocket to which that mail piece will be sorted, if the number of mail pieces sorted to that pocket has exceeded 300 or another predetermined limit. If so, a marker 10 is injected to the mail stream as described above and sorted to that pocket, and the count of mail pieces sorted to that pocket is reset to zero (step 56). The process then continues in like manner until all of the mail pieces have been sorted at decision 54. At this point, the sorter then sorts one marker 10 to each pocket 34 in a step 57 and then stops (end condition 58).

During sorting, the contents of each pocket 34 are swept to a tray 61 when the pocket is full (300 mail pieces) or nearly so. FIG. 5A illustrates the distribution of markers 10 among a number of trays 61 for a pocket 34. A first tray 61A contains at one end a marker 10A sorted prior to sorting in step 51 and a second marker 10 sorted when the pocket count exceeded 300. Second tray 61B is only partly full; the counter did not reach 300 a second time, so it only contains a marker 10B sorted at the end in step 57.

Figure 4B:
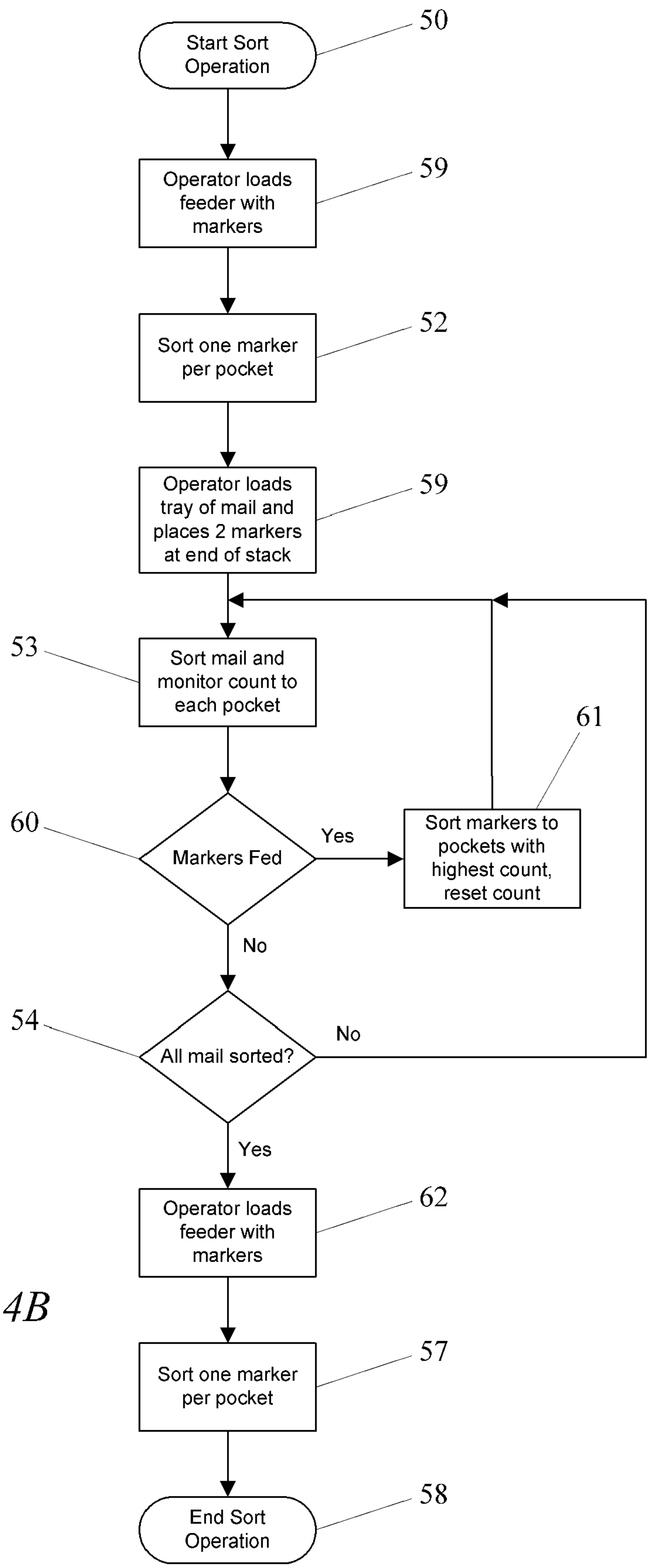
Figure 5B:
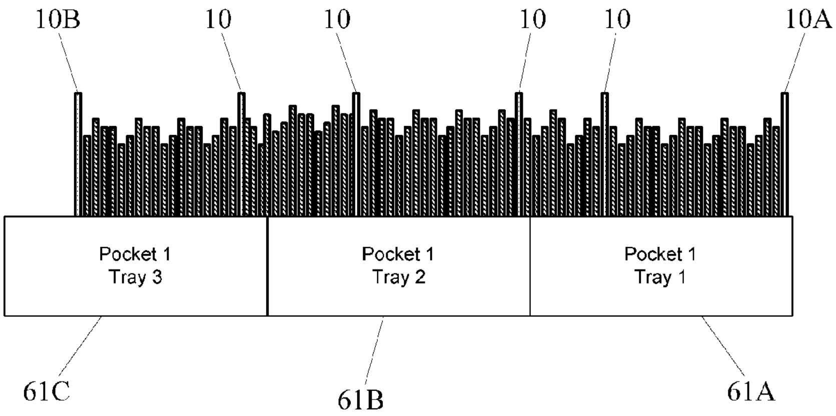
FIGS. 5A and 5B are diagrams showing the distribution of markers among trays of mail at the end of sorting.
Figure 5A:
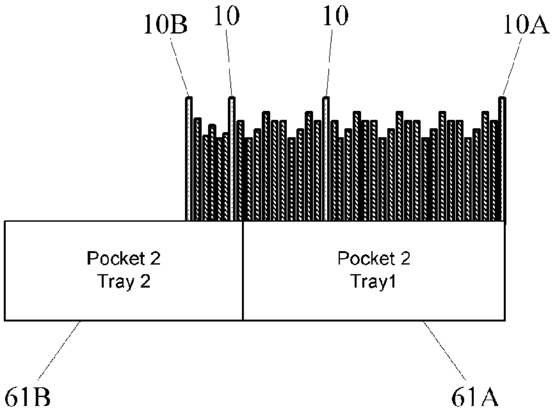
Figure 6:
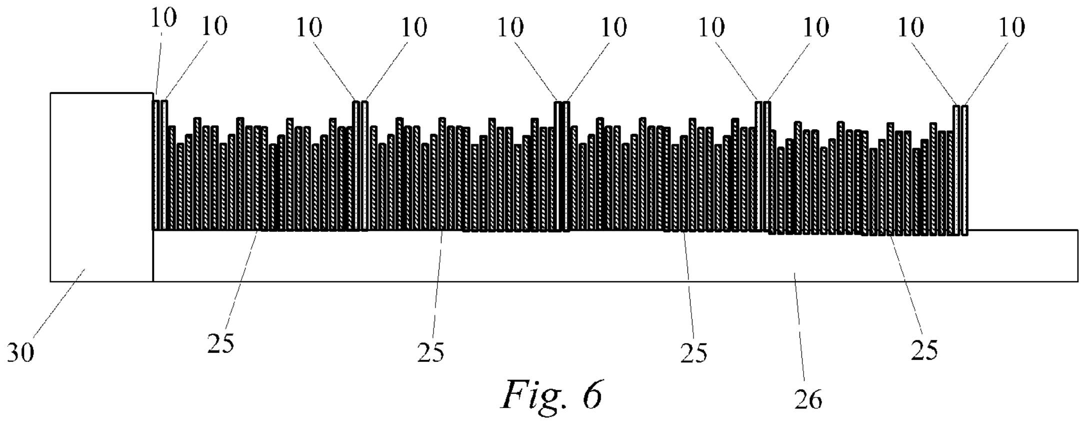
FIG. 6 is a schematic side view of mail and markers placed on the feeding ledge of the sorting machine of FIG. 2.

FIGS. 4B, 5B and 6 present a similar example for an alternative embodiment wherein the markers 10 are loaded manually rather than automatically. In this embodiment, mail is unloaded from trays onto ledge 26 of sorting machine 20. The operator inserts two markers 10 per tray unloaded, such at the beginning or end of each tray load, or one marker every so often based on the operator’s judgment. The computer controlling sorter 20 then sorts markers 10 on an as-needed basis as follows. At the start, the operator loads a stack of markers 10 on the feeder 30 (step 59) and the sorter sorts one marker per pocket as before. In a step 60 the operator unloads one or more trays of mail and places 2 markers 10 per tray load as shown in FIG. 6. It will be understood that this step may run concurrently with subsequent steps, i.e. additional trays will be unloaded and markers added as sorting progresses. As in the previous version of the process, sorting commences and the computer controlling the sorter maintains a count of mail pieces sorted to each pocket (step 53). When a marker is detected by the scanner during sorting (decision 60), the system determines which pocket currently has the highest count and sends the marker to that pocket (step 61). The sorting process then resumes and continues until all mail has been sorted at decision 54. The operator then loads feeder 30 with a stack of markers 10 (step 62) and the markers are sorted one per pocket in step 57, after which the sort ends. Optionally, a pocket may be designated for overflow markers 10. As an alternative to step 61, if the system determines that no pocket presently needs a marker 10, it is sent to the overflow pocket.

An example result of the foregoing process is shown in FIG. 5B. As in FIG. 5A, markers 10A and 10B mark the beginning and end of the mail pieces sorted to that pocket. Marker 10A is at the start of tray 1 and 10B is at the end of the mail loaded in tray 3. Markers 10 are distributed at intervals in each of the three trays 61, but the number of mail pieces between markers 10 varies because the markers are sorted on an as-fed basis rather than as-needed when an automatic feeder feeds the marker. This process will ensure, on the average, at least 1-2 markers per tray, and renders it highly unlikely that two markers will be stacked next to one another. Indeed, the computer can be programmed in step 57 to skip a pocket to which a marker was the last item sorted. As these examples illustrate, the number of mail pieces a pocket receives does not matter and need not be known in advance. Similarly, there is no need to use labeled trays; all trays can be used interchangeably.

In another version of a manual marker insertion process, the system instructs the operator when to put a marker into the system, such as by fighting an indicator telling the operator to put a marker onto the feeder ledge queue near the pickoff. This can be done easily by hand inserting the marker into the stack of mail being processed near the pick off point. Another way would be to have the operator periodically insert markers into the stream, and the system would prompt the operator only in the case of not having sufficient markers due to the timing of pockets filling up.

Figure 7:
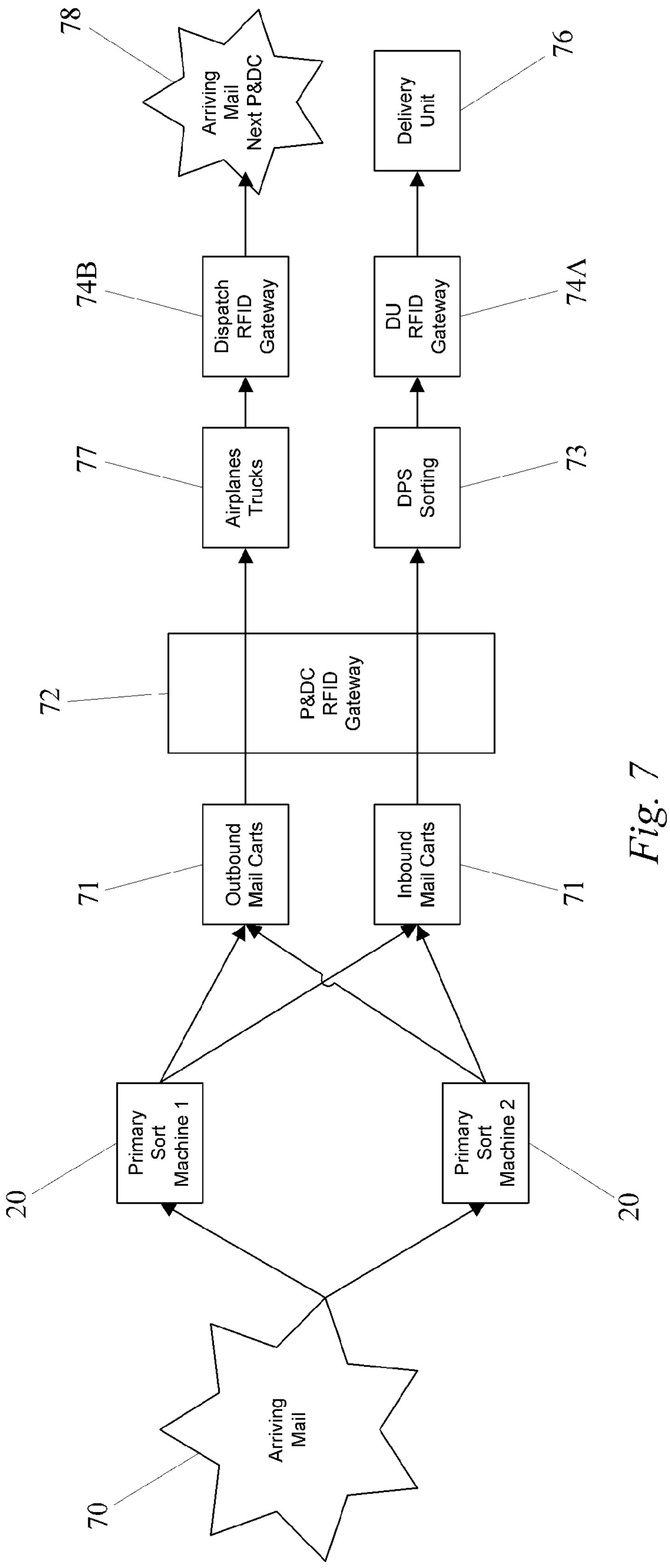
FIG. 7 is a flow diagram of mail tracked through a postal processing center according to the invention.

Once an initial sort has been completed, the trays 61 filled with mail and at least one marker per tray will be transported on for the next stage of processing. Incoming collection mail at a P&DC is typically handled as illustrated in FIG. 7. Arriving mail 70 is sent to one of two or more sorting machines 20. The trays of mail resulting from the sort contain mail that is incoming or inbound, that is, addressed to a destination within the geographic region served by that P&DC, or outgoing or outbound, i.e., addressed to a destination outside of that region. Outgoing mail is sorted based on the P&DC it needs to be sent to. These trays are placed on carts 71, some of which are carrying inbound mail and others which are carrying outbound mail. It is axiomatic that a single cart should not contain both inbound and outbound mail, since the intention is that all trays on the same cart 71 will be delivered to the same destination for secondary processing.

Figure 8:
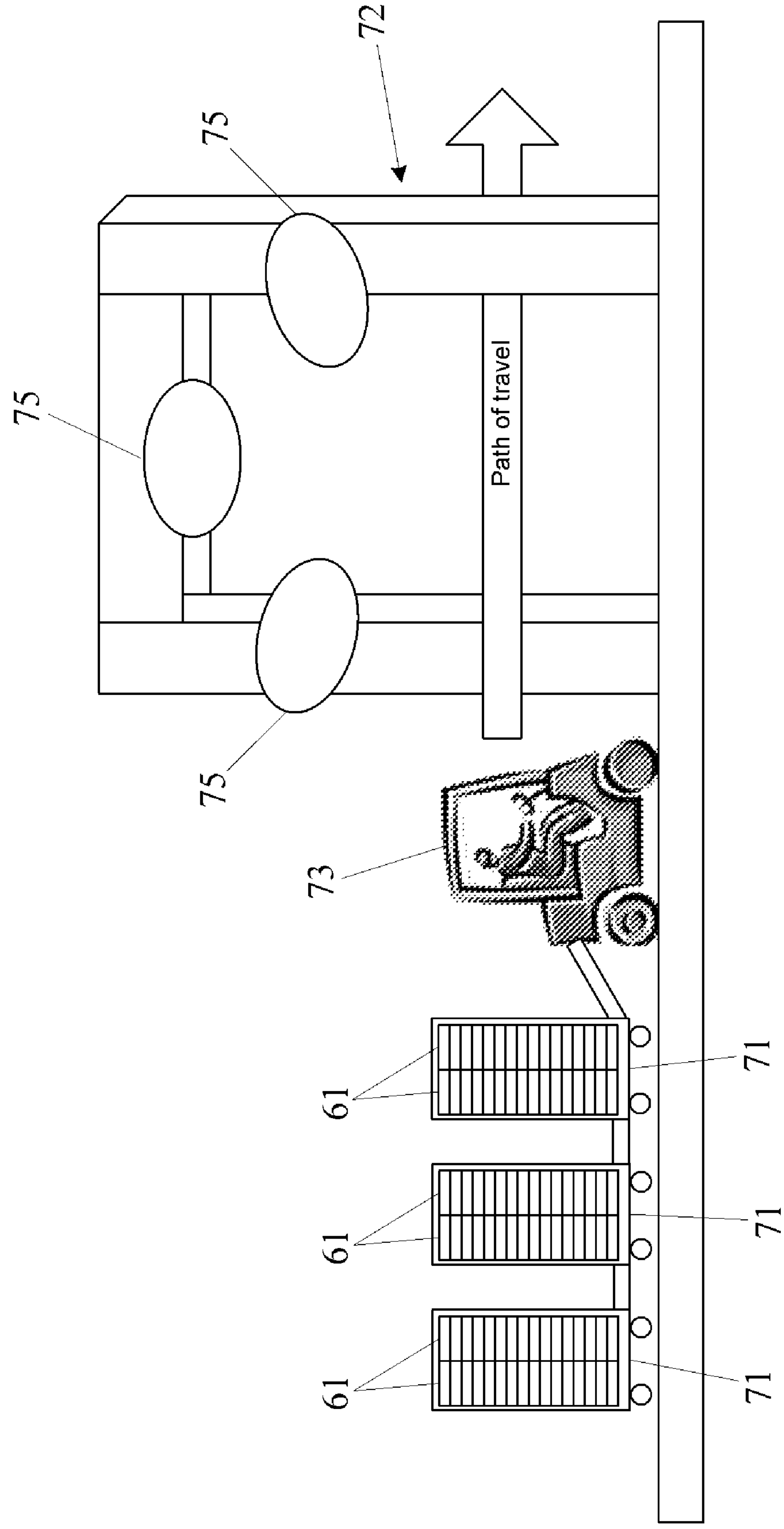
FIG. 8 is a schematic illustration of a vehicle transporting mail and markers in trays through an RFID gateway according to the invention.

As shown in FIGS. 7 and 8, to continue tracking the mail when it is not on a sorting machine 20, one or more RFID gateways 72 are provided at strategic locations where it is difficult if not impossible for the vehicle 73 transporting one or more carts 71 to leave an area without passing through the gateway 72. Each gateway 72 is provided with RFID antennas 75 and is connected to the control computer. After sorting is completed, the mail handler loads the trays of mail onto carts 71 and, in doing so, groups the mail according to the next operation. Typically three carts 71 are hooked to a tow vehicle 73 and the driver takes each cart to the appropriate next operation queue. As the driver leaves the sort area, he passes through the RFID gateway 72, which may extend across the aisle. This gateway 72 can read all of the markers 10 on the fly and also can determine which ones are grouped together on a cart 71. Each cart 71 also has a unique RFID tag and human-readable marking giving the tag value. The RFID tag is also read as the cart passes through the gateway 72, and if a problem is detected the system can tell the person tasked with evaluating the problem which cart to look at and the person can identify the cart by the visual marking.

The system database is updated to correlate the cart number with the numbers of all markers on that cart. The system has also recorded, based on the sort results, which markers represent inbound mail and which represent outbound mail. If a cart is found to contain both inbound and outbound mail, an alarm sounds and the operator takes action to rectify the error. According to a further aspect of the invention, the vehicle 73 or the operator of the vehicle may wear an RFID tag. In the event a problem needs to be traced to the one who saw the missing mail last, the identity of that postal employee can be determined.

If the system detects that the mail is incorrectly grouped, an immediate alarm can be raised. This could be a nearby visual indicator that lights a light and could also include a monitor screen that details the problem and marker/cart numbers. It could also be a remote indicator to a control room or a notice to a responsible person. The person driving the cart could have a badge with an RFID tag the system also read and a communication device that received the warning from the system. The vehicle could be tagged and have a monitor and this could display the warning to the driver. The system will keep a record of the markers as they are read when leaving the sort operation. At some time, all of the markers should have passed through the gateway. If all of the markers have not been read at a predetermined elapsed time from the end of the sort operation, an alarm is activated. This alarm can be to a control center, responsible individual, local annunciator or any combination of these. The alarm will identify the serial number of the missing marker(s).

Most inbound mail is transported to a secondary sorting operation where it is sorted to delivery point sequence. An inspection point may be provided at the feeding ledge of the DPS sorting machine 73 to verify that each tray contains mail to be sorted on that machine. A green light verifies that the tray is correct, or a red light indicates that the operator should not unload the tray or should replace the tray contents back into the tray. During DPS sorting, which is often in two passes, the markers are fed through with the mail and reassigned on an as-needed basis to pockets based on pocket counts as described above. Once DPS sorting is completed, the mail pieces are in carrier delivery order and are placed back into trays. The trays are transported by truck or otherwise to the delivery unit 76, such as a local post office. The delivery unit 76 may have its own RFID entry gateway 74A to verify that the shipment arrived at the correct destination. To coordinate verification of RFID scans over multiple locations, the computer system that tracks mail in one facility may communicate via a network with another computer at the delivery unit, or the system may be centralized and accessed through a network from different locations.

Outbound mail that passes through RFID gate 72 is loaded onto trucks or planes 77 and sent to another processing center (P&DC) 78. The processing center 78 has an RFID entry gateway 74B to verify that the shipment arrived at the correct destination. Such mail is then sorted at that center according to the process described above, this time as inbound mail.

Figure 9:
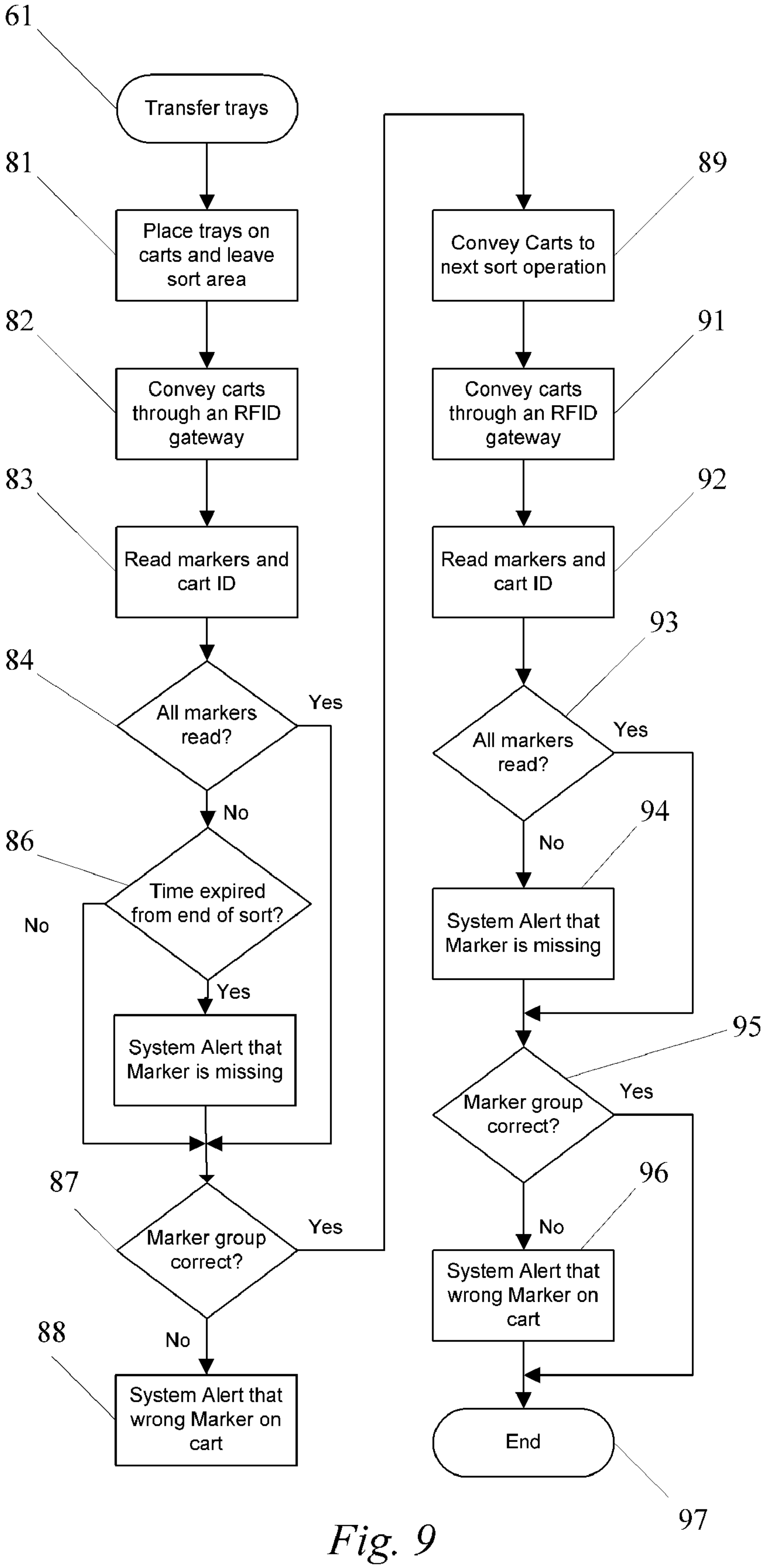
FIG. 9 is a flow diagram of a mail tracking process as mail is transported between primary and secondary sorting operations within a postal sorting facility.

FIG. 9 illustrates in more detail how the computerized mail tracking system for a processing center tracks mail after an initial sort and determines when a mail handling error has occurred. In FIG. 9, mail in trays is transported using carts as described above. Trays 61 loaded at the sorting machine are placed on carts 71 and leave the sorting area, e.g. pulled by a vehicle 73 or manually (step 81). Carts 71 are conveyed through the RFID exit gateway 72 (step 82). The markers 10 are scanned by antennas 75 in step 83. At a specified time from the end of the sort operation, the system compares the markers detected with the full list of markers used as provided from sorter 20. If all markers have not yet been read (decision 84), the system then determines if a time limit from the end of the last sort has expired (decision 85). If the time limit has expired, a system alert is issued (step 86) and the human operator attempts to find out where the mail associated with the missing markers are.

The system also checks each cart for mail grouping errors, for example, to ensure that outbound and inbound mail are not together on the same cart (decision 87). If a problem is found, a system alert is issued (step 88) and the human operator is directed to regroup the trays. Once any problems are corrected, the carts are conveyed on to the next sort operation (step 89) and pass through another RFID gateway 72 which reads the mail markers and also the cart marker (steps 91, 92). Once again a check is made to ensure that all mail designated for secondary sorting from the previous sort(s) is present for the secondary sort (93, 94), and that the markers are correctly grouped (95, 96), that is, no mail is brought to that secondary sort by mistake. At this point transport tracking ends (step 97). Secondary sorting can begin thereafter, or can begin before all of the mail from the previous sort has been queued.

If the first and second sort operations are connected by a tray conveyor system, so that no cart groupings are used, the process is much the same as shown in FIG. 9, but simplified. There is no cart RFID tag to read and hence the check for improper cart grouping can be omitted. The trays with markers are placed on the conveyor system to take the mail either to a buffer or a sort operation queue. An RFID gateway placed over the conveyor system reads the markers as the trays exit the sort operation. It is still useful, prior to starting the secondary sort, to make certain that no unexpected mail pieces are present. In this embodiment a second gate may be built into the sorter ledge and provide a red or green signal each time a tray is unloaded, as described above.

The tracking system of the invention may run a number of sub-processes at the same time as needed by the state of operations with the postal facility. For example, alarm events may be driven by postal time constraints, as in the following example. It is assumed in this example that a large volume of mail found on a number of different carts must be sorted in a secondary sort in no less than 3 hours. The primary sort(s) producing the mail for the secondary sort are running at the same time and are completed in no more than 2 hours, such that all the mail expected to be received for the secondary sort should have passed through the corresponding RFID gateway after 2 hours have elapsed.

Figure 10:
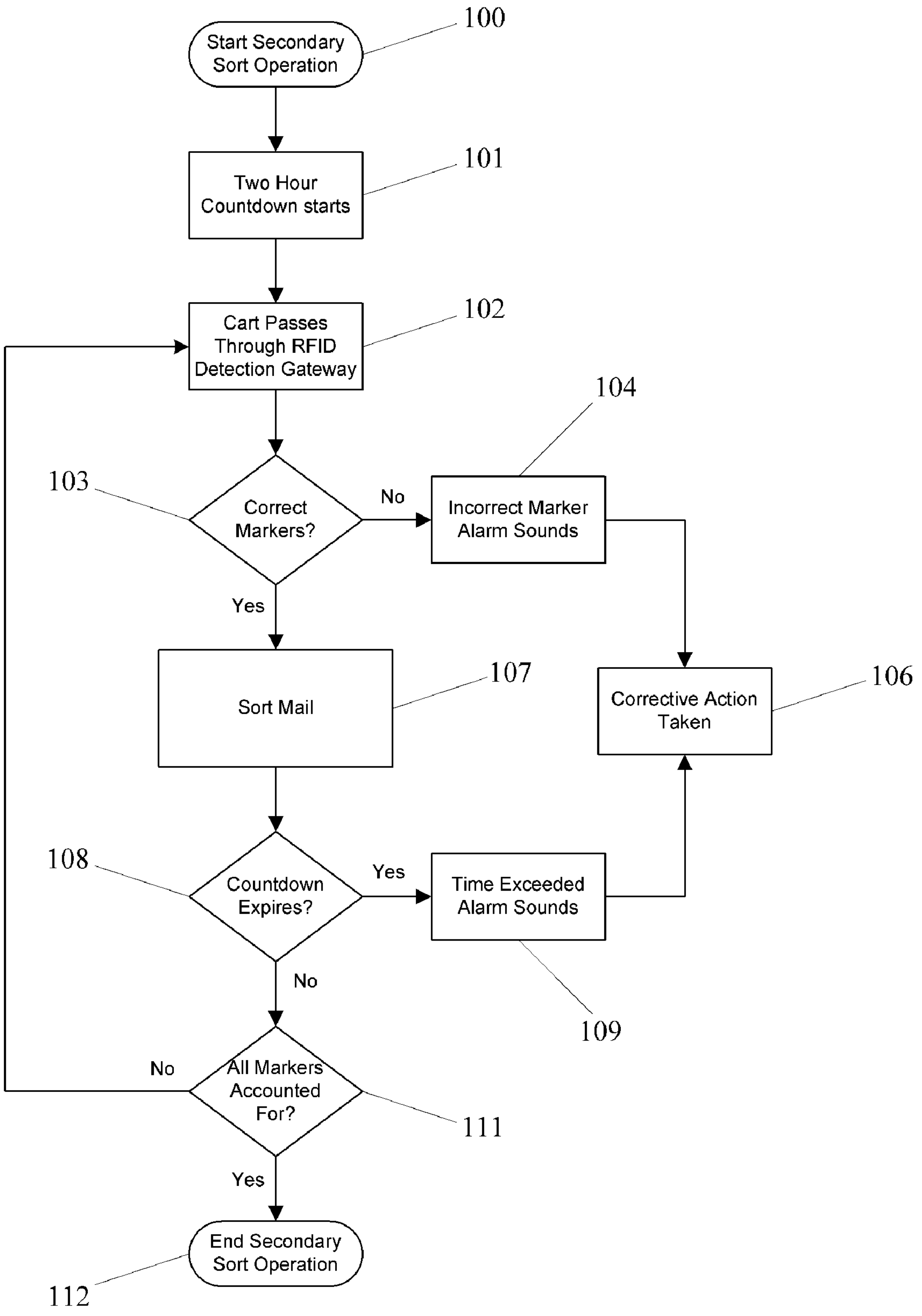
FIG. 10 is a flow diagram of sort monitoring process according to the invention.

Referring to FIG. 10, at the start of the secondary sort (100) the control computer starts a 2 hour countdown timer (step 101). The first cart for the secondary sort (100) is brought through an RFID detection gateway and the markers on it are detected (step 102). If an incorrect marker is detected (decision 103), an alarm sounds and corrective action is taken (steps 104, 106). Otherwise sorting commences at step 107.

The total number of mail pieces expected for the secondary sort is known no later than the end of the primary sort, in this case 75,000 mail pieces. The secondary sort starts using the mail from the first cart. When the time limit expires (decision 108), the computer checks to see that all 75,000 mail pieces, that is all of the markers associated with those mail pieces, have been brought through the RFID gateway. If not, an alarm sounds (step 109) and the operator attempts to find the missing cart(s) as soon as possible. If all markers have been detected (decision 111), the sorting process ends (112), otherwise mail from the next cart is sorted as steps 102-109 are repeated. The tracking system of the invention thus can identify a potential problem far enough in advance so that it can be remedied before a postal deadline passes.

In its most basic form, the tracking system of the present invention creates temporary associations between marker ID's and groups of mail being processed. More advanced systems according to the invention can track additional information. For example, the system may also maintain a record of the mail sorted between markers sent to a given sorter output pocket. In process-driven industries, measurement of leakage is an important metric that identifies product lost between operations. The invention facilitates this measurement by providing a means to identify mail that was sorted between two markers on a first sorting operation that is not present on a subsequent sorting operation.

The manner in which trays are loaded onto the sorters presents a complication in two ways. The first is that it is not practical to instruct the operator to run trays with markers in a particular order, thus markers may appear out of sequence (except in second pass DPS sorts) and may even be from different sorting systems that were working in parallel on the previous sorting operation. The second complication is that the second sorting operation may be performed on two or more systems working in parallel, and trays from a previous sorting system may go to different sorting systems on the following operation. Trays represent a break in the sequence of mail between sequentially inserted markers if the markers are placed in different trays.

To overcome these complications, the system of the invention records the address information and a unique mail piece identifier (if used) for mail run on a subsequent sorting pass. The information is saved in sequence along with the positions of the RTM's in the mail stream. This data can then be used to determine the tray boundary by the break in the sequence before and after the marker.

Figure 11:
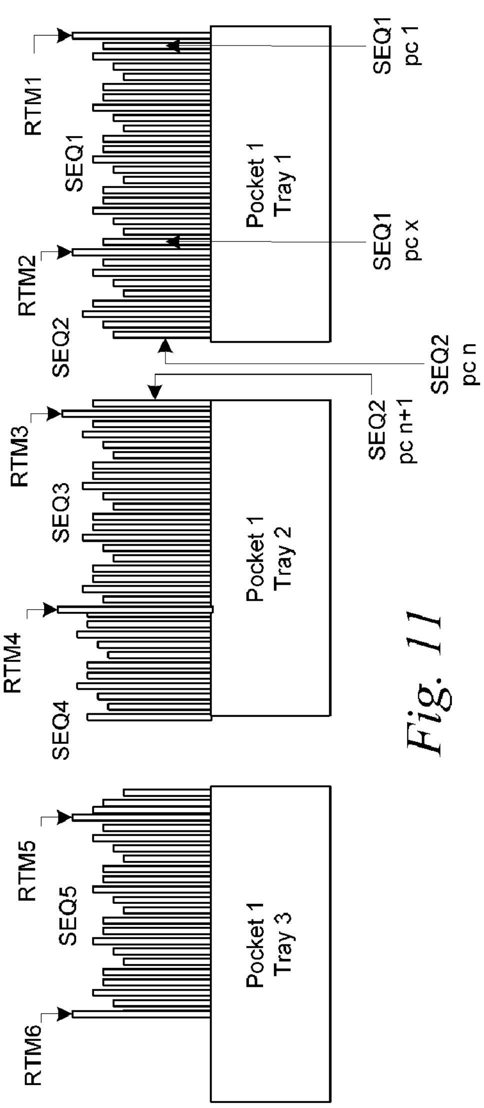
FIG. 11 is a schematic side view of the trays of FIG. 5A just prior to a second sorting pass.
Figure 12:
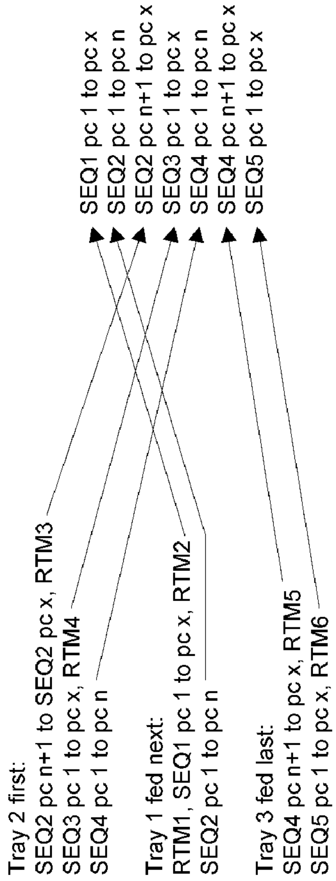
FIG. 12 is a diagram of computerized mail sequence reconstruction as the mail in the trays of FIG. 11 are fed through in a second sorting pass.

An example is shown in FIGS. 11 and 12. FIG. 11 represents the same trays of sorted mail shown in FIG. 5A. The computer saves in memory and/or to data storage media the positions of the markers 10 shown as RTM1 to RTM6, and the sequence of mail between RTM's as SEQ1 to SEQ5. For each sequence, pc x represents the number of the last mail piece before the next marker, and pc n represents the last mail piece in a tray before the sequence is broken between tray boundaries, resuming at pc n+1. In the example shown, at the next sorting operation, tray 2 is fed first, followed by tray 1 and then tray 3.

In the database, the mail sequence is saved in consecutive order, indexing it relative to its associated marker 10. Mail piece data saved includes at least the destination code for the mail piece, normally an 11-digit zip code, along with any other scannable codes which may help to identify the mail piece such as its UV tag ID code, Planet code or intelligent mail bar code. After the second sort is completed, the data is assembled to put the mail associated with each RTM in a sequential database to be compared to the original database. If nothing is missing, it is possible to completely reconstruct the original sequence by arranging the tray boundaries in the correct order. FIG. 12 illustrates the sequences scanned by the computerized control system in the second sort, and how it accounts for the breaks in the sequence in reconstructing the original sequence. Once all of the partial sequences have been recorded, the system reviews the results and tries to account for all of the mail pieces in sequences 1-5, as illustrated.

Since it is possible that two mail pieces in a row will have the same destination code and that not all mail pieces will have other ID codes such as UV, Planet or intelligent mail bar codes, the control system reconstructing the sequence will preferably compare sub-sequences of the next several mail pieces with a possible sequences it expects to find at that location before it decides which sequence mail at a break point comes from. Since errors are possible as discussed below, it can be programmed to assume it has found a sequence even if the result of the comparison is less than a 100% match (for example, one mail piece doesn't match but the next five in a row do.) It will also use a mail piece it can uniquely identify due to its confirming codes as the basis for identifying neighboring mail pieces, when necessary.

The control system can be programmed to resolve certain types of error situations. If, for example, the mail piece of SEQ2 pc n+1 had slipped out of the tray onto the floor, the position of RTM3 and the other mail pieces from pc n+2 to pc x would so indicate. The loss of a single mail piece might or might not prompt corrective action. If a section of SEQ2 had accidentally been replaced as a group into tray 3, the control system could recognize in due course that part of SEQ2 was missing and that and that the missing sequence had appeared at another, unexpected position. However if a substantial portion of SEQ2 could not be found, an alarm would notify the operator of the error.

The system records any missing mail pieces and the leakage metric is determined. Operational analysts can use this data to measure the amount of mail that is "falling out" of sort operations and determine potential causes. If leakage above a specified level is detected, an immediate alarm can be raised to alert personnel to search for the missing mail.

The tracking system of the invention may have both local and central user interfaces. The system may display locally and or in a control center the markers as they are logged in and the markers remaining to be logged in. If a marker is read that should not be entered into the current operation, an alarm can be raised locally, in a control room, to a responsible person, or combination of these. At a predetermined time relative to the start of the current operation, the system will generate an alarm that will indicate the missing markers and the previous points in the system where these markers were read. If all markers are accounted for, the system may indicate an "all is well" condition to inform the operators that all of the mail has been logged in.

As noted above, when a feeder operator brings a tray of mail to the feeder ledge a local RFID reader will read the markers present and immediately raise an alarm to indicate the tray should not be run. This is particularly useful when doing a two-pass sort for delivery point sequencing to avoid feeding a tray of mail out of sequence on the second pass. In the current processing environment mistakenly loading trays out of sequence on second pass DPS is a common error that is very costly because this mail is sorted to a special pocket and DU clerk and carrier must then sort this mail by hand.

At the mail processing facility at which the foregoing steps occur, a database is maintained that correlates three identifying pieces of information about each marker: RFID tag number (9 digits), a value of bar code 13, and the 4-digit human-readable serial number which is part of the ID number 12. The data transmitted by the RFID tag includes the tag number and serial number, hence thus with a 9 digit tag number and 4 digit serial number, ten thousand billion unique marker ID numbers can be created. Markers 10 should be durable, preferably made of sheets of flexible plastic or paper, so they can be reused and sorted many times, lasting 6 months or longer. Depending upon procedures implemented, the markers could be sorted out during the second pass of delivery point sequencing, or, preferably removed by the carrier during delivery and returned for re-use.

Figure 13:
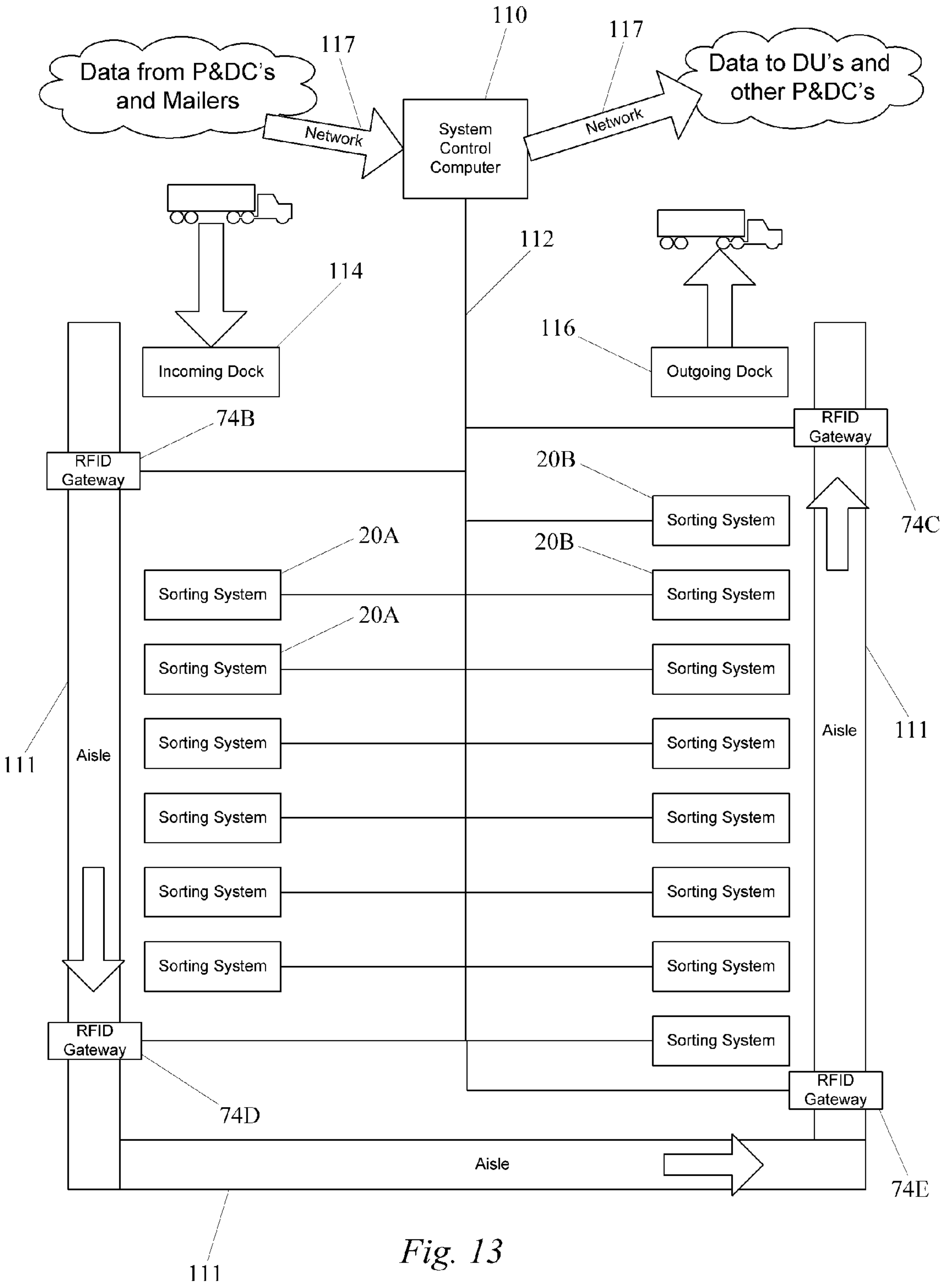
FIG. 13 is a schematic diagram of a control system for a mail tracking process according to the invention.

The mail tracking process of the invention is computer-implemented except as to steps involving a human operator as described above. A mail tracking control system for a postal processing facility is illustrated in FIG. 13. Each sorter 20, which include both primary sorters 20A and secondary sorters 20B, has its own control computer which communicates with a system control computer 110 for the entire facility. Gateways 74 set in aisles 111 likewise transmit RFID tag scanning results to system control computer 110. Communication occurs through a local network 112, such as an Ethernet. Control computer 110 logs mail into and out of the facility from an entry RFID gateway 74B and an exit RFID gateway 74C, which are located near the end of aisles leading to an incoming mail dock 114 and an outgoing mail dock 116, respectively. Control computer 110 also logs mail out of the primary sorting area at an RFID gateway 74D and into the secondary sorting area at an RFID gateway 74E. Control computer 110, as discussed above, also receives data from other P&DC's and commercial mailers, and sends data to delivery units and other P&DC's through a wide area network 117 such as the Internet. This control scheme could be made more or less centralized than described in this example.

The present invention thus provides a process that continues tracking mail even after presorted mail tagged by tray as described in the Pintsov '833 patent cited above is removed from the original tray and sorted. In addition, originating mail such as collection mail that does not arrive in a manifested and tagged tray can be tracked. Instead of applying RFID tags to mail pieces or to trays for use with letter mail, RFID tagged markers (RTM's) are added to the stream of letter mail being processed on the sorter.

Pintsov '833 provides hierarchical tracking of presorted mail based on manifests provided by the mailer and uses RFID tags on skid, trays, and mail pieces. Once the mail has been sorted the hierarchy to a tray is lost and the ID tag on a letter mailpiece is virtually useless. It is not feasible to read an RFID tag and associate it with a given mail piece when the mail is moving on a high speed transport such as used in a DBCS machine. When placed in trays, the system cannot reliably read the RFID because of shading. This is avoided in the present invention when there are at least four inches between adjacent markers. A cart full of tagged mail pieces per Pintsov would overwhelm a RFID reader.

On the other hand, RFID tagging of individual parcels, as opposed to letter mail, is useful. Packages can be read in containers such as hampers and sacks, and spacing between packages on a sorter is usually sufficient to allow correct association of the tag with the parcel, hence the parcel does not require facing as for an optical reader. For parcels the cost of postage and value of the mail piece justify the cost of the RFID tag. RFID tags on flats trays are likewise useful. An automatic tray handling system (ATHS) enables practical association of a tray with a sorter output. Because flats are sorted directly into trays, association of mail to the tray is inherent. See Hillerich, Jr. et al. U.S. Pat. No. 7,195,236, Mar. 27, 2007, the contents of which are incorporated by reference herein.

In view of the foregoing, according to a further aspect of the invention, the system according to the invention is used for tracking of letter mail, a system based on tray RFID labeling is used to track flats, and a system based on mail piece RFID labeling is used for parcels. For this purpose, the disclosure of Pintsov U.S. Pat. No. 6,801,833 is incorporated by reference herein.

Once this system is implemented, a cart with mail could be rolled to a reading station after it is filled with trays of mail from a sorting operation. The markers are read by the reader and associated with a cart identifier such as an RFID tag or barcode label. In this manner, the hierarchy of identification is again established for subsequent operations. In facilities with a tray management system, the markers could be read as tray identifiers with no need to have additional information on the tray.

Although the invention has been described with regards to a specific preferred embodiments thereof, variations and modifications will become apparent to those of ordinary skill in the art. For example, the RTM's could be replaced by other types of markers which can be readily scanned. Bar codes prominently placed along the protruding top margin of each marker could be scanned at the gateways. It is therefore the intent that the appended claims be interpreted as broadly as possible in view of the prior art as to include all such variations and modifications.

The invention claimed is:

1. A computer-implemented process of tracking mail during postal handling at a postal processing facility, comprising:
- initially sorting an incoming stream of mail on an automated sorting machine to a series of pockets based on a sort scheme;
- during sorting,
  - introducing RFID-tagged, machine-sortable markers into the incoming mail stream at intervals and sorting the RFID-tagged markers with the mail into pockets of the sorter,
  - optically scanning identifier data on the mail pieces and RFID-tagged markers in the stream as the mail pieces and markers are transported along a conveyor system in the sorting machine,
  - identifying a marker based on the result of the optical scan, thereby distinguishing markers from mail pieces during sorting, and
- diverting a marker to a sorter pocket determined by a sort scheme that causes at least one marker to be swept to each of the set of trays;
- sweeping the mail and RFID-tagged markers from the pockets into trays, wherein the markers are introduced such that at least one marker is swept to each of a set of trays containing the sorted mail;
- transporting the trays containing the mail and RFID-tagged markers from the automated sorting machine; and
- during a postal operation subsequent to the initial sorting, scanning one or more of the RFID-tagged markers; and
- identifying mail from the initial sorting from the scanned RFID-tagged markers.

2. The process of claim 1, wherein each marker has a unique ID code in its RFID tag, and further comprising:
- associating marker ID codes with mail from the initial sorting in a database accessed by a computerized control system; and
- referencing an ID code of a marker to determine associated mail in the database.

3. The process of claim 2, further comprising:
- during the initial sorting, optically scanning identifier data on the mail pieces and RFID-tagged markers in the stream as the mail pieces and markers are transported along a conveyor system in the sorting machine;

saving in the database the order in which mail pieces and RFID-tagged markers were sorted to each pocket;

sweeping the mail and markers into trays in a manner that maintains the saved order for each pocket; and where the subsequent postal operation is a sorting operation, following scanning of the markers prior to the subsequent sorting operation, determining the extent to which mail referenced in the database is missing from the subsequent sorting operation.

4. The process of claim 1, wherein the RFID tag of each marker has a unique ID code and the marker also has an optically scannable code which is correlated to the ID code of the marker, further comprising:

associating marker ID codes with mail from the initial sorting in a database accessed by a computerized control system; and referencing an ID code of a marker to determine associated mail in the database.

5. The process of claim 1, wherein the subsequent postal operation is a second sorting operation for which mail included in one or more trays from the initial sorting is required.

6. The process of claim 5, wherein a computer controlling the second sorting operation on an automated sorting machine determines if all markers associated with mail from the initial sorting have been scanned during the second sorting operation.

7. The process claim 1, wherein the subsequent postal operation comprises shipping one or more trays each containing one of the RFID-tagged markers to another postal processing facility, and scanning the RFID-tagged markers of each shipped tray at that postal processing facility.

8. The process claim 1, further comprising recovering the RFID-tagged markers for re-use.

9. A computer-implemented process of tracking mail during postal handling at a postal processing facility, comprising:

initially sorting an incoming stream of mail on an automated sorting machine to a series of pockets based on a sort scheme;

during sorting, introducing RFID-tagged, machine-sortable markers into the incoming mail stream at intervals, wherein each marker has a unique ID code in its RFID tag and also has an optically scannable code which is correlated to the ID code of the marker in a database accessed by a computerized control system;

optically scanning identifier data on the mail pieces and the optically scannable code on the markers in the stream as the mail pieces and markers are transported along a conveyor system in the sorting machine;

identifying a marker based on the result of the optical scan, thereby distinguishing markers from mail pieces during sorting;

diverting a marker to a sorter pocket determined by the sort scheme;

associating the ID code of the diverted marker with mail sorted to that pocket in the database accessed by the computerized control system;

sweeping the mail and markers from the pockets into trays, wherein the sort scheme diverts markers to pockets such that at least one marker is swept to each of a set of trays containing sorted mail;

transporting the trays containing the mail and markers from the automated sorting machine; and tracking the mail by reading the RFID tag of the markers when the mail is being transported in the trays;

during a postal operation subsequent to the initial sorting, scanning one or more of the markers; and identifying mail from the initial sorting from the scanned markers by referencing an ID code of a marker to determine associated mail in the database.

10. The process of claim 9, wherein the subsequent postal operation is a second sorting operation for which mail included in one or more trays from the initial sorting is required.

11. The process of claim 10, wherein a computer controlling the second sorting operation on an automated sorting machine determines if all markers associated with mail from the initial sorting have been scanned during the second sorting operation.

12. The process of claim 9, further comprising:

saving in the database the order in which mail pieces and RFID-tagged markers were sorted to each pocket;

sweeping the mail and markers into trays in a manner that maintains the saved order for each pocket; and where the subsequent postal operation is a sorting operation, following scanning of the markers prior to the subsequent sorting operation, determining the extent to which mail referenced in the database is missing from the subsequent sorting operation.

* * * * *